United States Patent
Wallace

(10) Patent No.: US 6,200,469 B1
(45) Date of Patent: *Mar. 13, 2001

(54) SYSTEM FOR REMOVING POLLUTANTS FROM WATER

(75) Inventor: Scott D. Wallace, St. Paul, MN (US)

(73) Assignee: North American Wetland Engineering, Forest Lake, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,075

(22) Filed: Jun. 23, 1998

Related U.S. Application Data

(60) Provisional application No. 60/050,533, filed on Jun. 23, 1997.

(51) Int. Cl.⁷ ............................... C02F 3/30; C02F 3/32; C02F 3/34
(52) U.S. Cl. ................. 210/150; 210/170; 210/220; 210/602; 210/605; 210/903
(58) Field of Search .............................. 210/96.1, 116, 210/139, 143, 149, 170, 220, 255, 258, 262, 602, 614, 617, 630, 742, 744, 747, 605, 150, 903; 47/59

(56) References Cited

U.S. PATENT DOCUMENTS

| | | |
|---|---|---|
| 3,770,623 | 11/1973 | Seidel . |
| 3,925,206 | 12/1975 | Dea . |
| 4,169,050 | 9/1979 | Serfling et al. . |
| 4,333,837 | 6/1982 | Plosz et al. . |
| 4,415,450 | 11/1983 | Wolverton . |
| 4,839,051 | 6/1989 | Higa . |
| 4,855,040 | 8/1989 | Kickuth . |
| 4,872,985 | 10/1989 | Dinges . |
| 5,017,040 * | 5/1991 | Mott ..................................... 210/170 |
| 5,050,341 | 9/1991 | Breezer et al. . |
| 5,087,353 | 2/1992 | Todd et al. . |
| 5,156,741 * | 10/1992 | Morrison et al. ..................... 210/602 |
| 5,273,653 | 12/1993 | Kikuth . |
| 5,389,257 | 2/1995 | Todd et al. . |
| 5,601,236 * | 2/1997 | Wold ..................................... 239/63 |
| 5,676,828 | 10/1997 | Kallenbach et al. . |
| 5,690,827 | 11/1997 | Simmering et al. . |
| 5,762,801 | 6/1998 | Jönsson et al. . |
| 5,906,745 * | 5/1999 | Eto ........................................ 210/605 |
| 5,993,649 * | 11/1999 | DeBusk et al. ....................... 210/170 |

FOREIGN PATENT DOCUMENTS

| | | |
|---|---|---|
| 300 015 A7 | 5/1992 | (DE) . |
| 41 19 835 A1 | 12/1992 | (DE) . |
| 260187 * | 3/1988 | (EP) ..................................... 210/614 |
| 3052696 * | 3/1991 | (JP) ..................................... 210/614 |

OTHER PUBLICATIONS

*Onsite Wastewater Treatment and Disposal Systems*, Design Manual, U.S. Environmental Protection Agency, pp. 327; 332–333; Oct. 1980.

*Design and Performance of PVC Dosing Siphons*, Mote et al., Transactions of the American Society of Agricultural Engineers, vol. 26, No. 3, pp. 809–813; 1983.

(List continued on next page.)

Primary Examiner—Matthew O. Savage
(74) Attorney, Agent, or Firm—Patterson, Thuente, Skaar & Christensen, P.A.

(57) ABSTRACT

A system for removing pollution from water, utilizing a subsurface constructed wetland system using forced bed aeration and variable water levels, to promote greater root depth and better root structure of the wetland vegetation, and to establish staged anaerobic and aerobic zones within the system.

23 Claims, 6 Drawing Sheets

OTHER PUBLICATIONS

*Wetland Vegetation*, Guntenspergen et al. IN Constructed Wetlands for Wastewater Treatment: Municipal, Industrial, and Agricultural, Lewis Publishers, Inc., Chapter 5, pp. 73–88; 1989.

*Integrated Wastewater Treatment Using Artificial Wetlands: A Gravel Marsh Case Study*, Gersberg et al. IN Constructed Wetlands for Wastewater Treatment: Municipal, Industrial, and Agricultural, Lewis Publishers, Inc., Chapters 10, pp. 145–152; 1989.

*Configuration and Substrate Design Considerations for Constructed Wetlands Wastewater Treatment*, Steiner et al. IN Constructed Wetlands for Wastewater Treatment: Municipal, Industrial, and Agricultural, Lewis Publishers, Inc., Chapter 29, pp. 363–367; 1989.

*Domestic Wastewater Treatment Using Emergent Plants Cultured in Gravel and Plastic Substrates*, Burgoon et al. IN Constructed Wetlands for Wastewater Treatment: Municipal, Industrial, and Agricultural, Lewis Publishers, Inc., Chapter 38f, pp. 536–541; 1989.

*General Design, Construction, and Operation Guidelines: Constructed Wetlands Wastewater Treatment Systems for Small Users Including Individual Residences*, 2d Ed. Technical Support Series, Water Management Resources Group, Tennessee Valley Authority, pp. 29–30; May 1993.

*Pilot–Scale Nitrification Studies Using Vertical–Flow and Shallow Horizontal–Flow Constructed Wetlands Cells*, Watson et al., IN Constructed Wetlands for Water Quality Improvement, CRC Press, Inc., Chapter 31, pp. 301–302, 312; 1993.

Phosphorus Removal from Wastewater in a Constructed Wetland, Davies et al., IN Constructed Wetlands for Water Quality Improvement, CRC Press, Inc., Chapter 32, pp. 315–320; 1993.

*Macrophyte–Mediated Oxygen Transfer in Wetlands: Transport Mechanisms and Rates*, Brix, IN Constructed Wetlands for Water Quality Improvement, CRC Press, Inc., Chapter 41, pp. 391–398; 1993.

*Species–Specific Aeration of Water by Different Vegetation Types in Constructed Wetlands*, Stengel, IN Constructed Wetlands for Water Quality Improvement, CRC Press, Inc., Chapter 45, pp. 427–434; 1993.

*Application of Constructed Wetlands to Treat Wastewaters in Australia*, Davies, et al., IN Constructed Wetlands for Water Quality Improvement, CRC Press, Inc., Chapter 64, pp. 577–584; 1993.

*Michigan Criteria for Subsurface Sewage Disposal*, Michigan Department of Public Health, pp. 5 & 14, Apr. 1994.

*Sewage Waste Amendment Marsh Process Project (S.W.A.M.P.)*, The Friends of Fort George, Interim Report, 163 pp.; Sep. 1995.

SWAMP Pilot Scale Wetlands—Design and Performance, Lemon et al., The Friends of Fort George, pp. 1–19 & Appendix; Jun. 1996.

*Reciprocating Subsurface–flow Constructed Wetlands for Removing Ammonia, Nitrate, and Chemical Oxygen Demand: Potential for Treating Domestic, Industrial and Agricultural Wastewaters*, Behrendset al., Water Environment Federation, pp. 251–262; 1996.

*Compact Biofilm Reactor for Aerobic Wastewater Treatment*, Dickeson et al., Water Environment Federation, pp. 469–471; 1996.

*Design and Performance of Subsurface Flow Constructed Wetlands in Norway*, Jenssen et al., , 12 pages, IN Symposium Constructed Wetlands in Cold Climates—Design, Operation, Performance; Jun. 1996.

*Influence of Temperature on Biogeochemical Processes in Constructed Wetlands: Implications to Wastewater Treatment*, Reddy et al.; IN Symposium Constructed Wetlands in Cold Climates—Design, Operation, Performance, pp. 2 pages; 1996.

*Peat Filter and Engineered Wetland Combined System for Treatment of Landfill Leachate*, Castonguay et al., IN Symposium Consturcted Wetlands in Cold Climates, 2 pages; Jun. 1996.

*Septic System Becomes Most Visited Area at Nature Center*, Patterson et al., Land and Water magazine, pp. 44–46; May/Jun. 1996.

*BREW—Bio Reactor Engineered Wetland for Wastewater Treatment*, Ontario Centre for Environmental Technology Advancement, 2 pages; Apr. 1997.

*Constructed Wetlands for Domestic Wastewater Treatment*, Huang et al, Unknown Publication, pp. 66–67 & 70–71; (before Jun. 23, 1998).

*Dosing of Septic Tank Effluent to Improve System Performance*, May, Unknown Publication., 4 pages; (before Jun. 23, 1998).

*Automatic Dosing Siphons for Small Disposal Plants*, Fluid Dynamics, Inc., pp. 1–6, 11–12; (before Jun. 23, 1998).

*The Influence of Cold Climate Upon Constructed Wetlands: Performance of Treating Domestic Wastewater and Landfill Leachate in Norway*, Jenssen et al., Unknown Publication, pp. 137–145, (before Jun. 23, 1998).

* cited by examiner

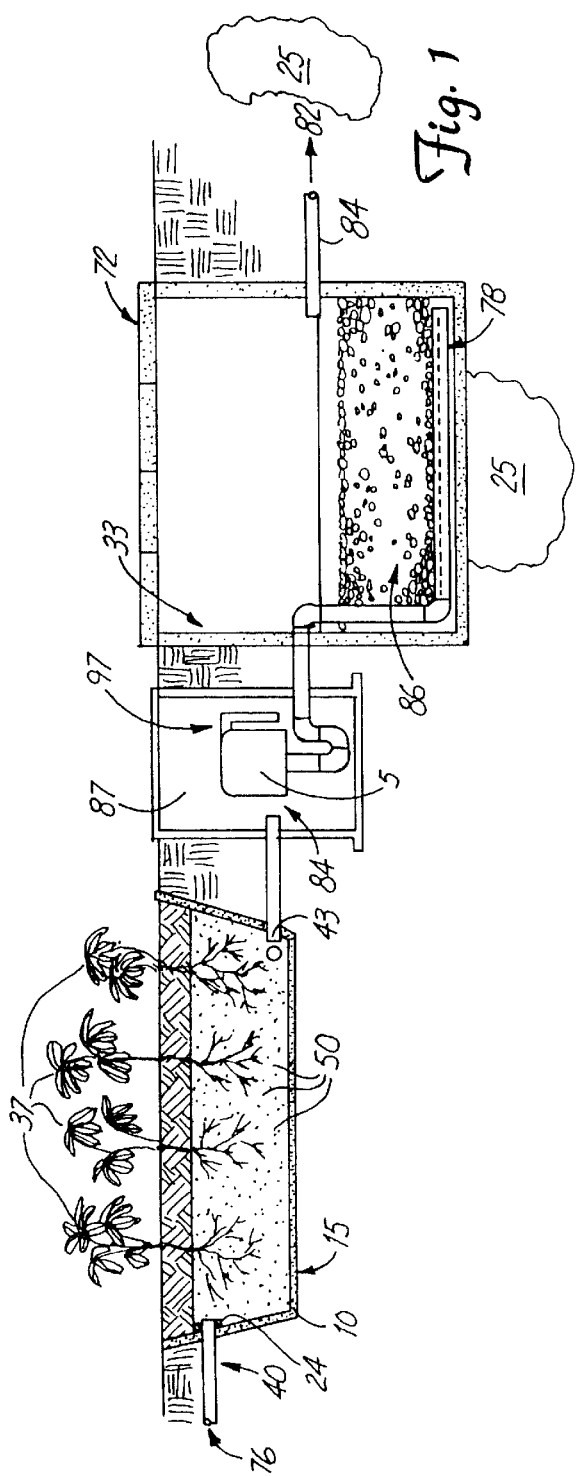
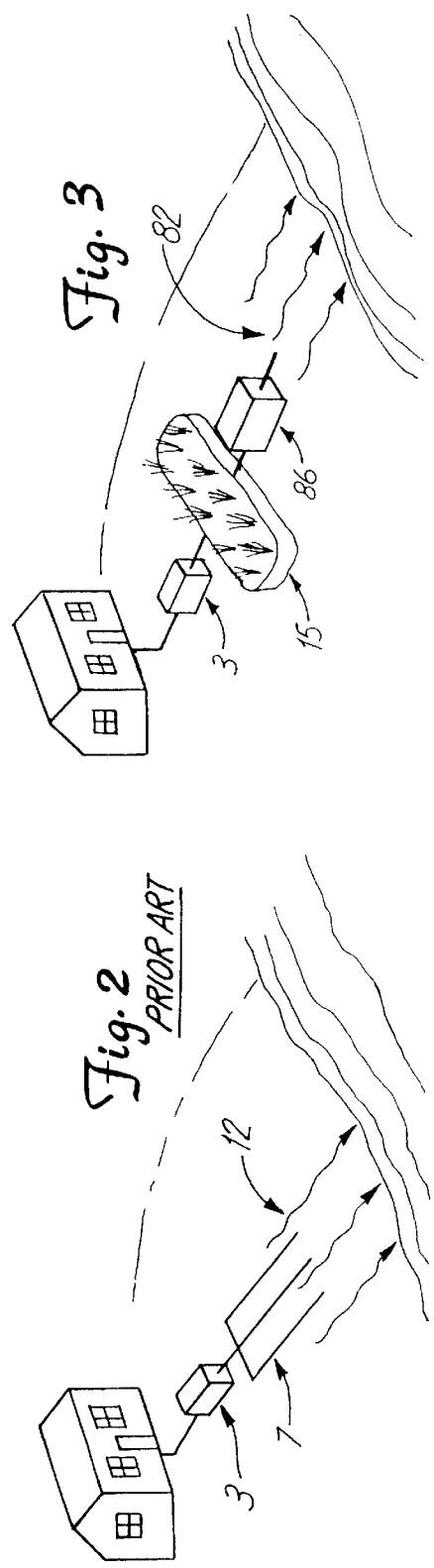

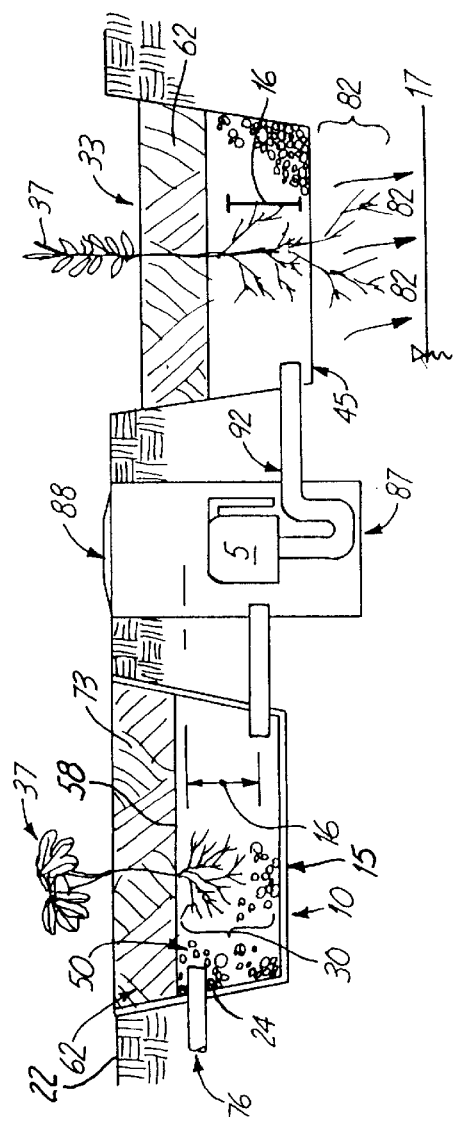
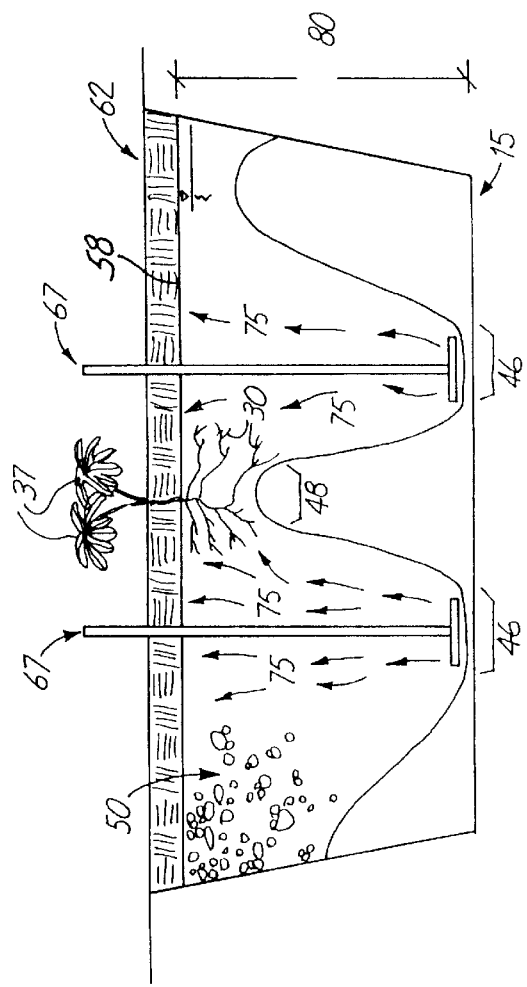

SYSTEM FOR REMOVING POLLUTANTS FROM WATER

This application claims priority under 35 U.S.C. § 119 (e) to, and hereby incorporates by reference, U.S. Provisional Application No. 60/050,533, filed Jun. 23, 1997.

FIELD OF INVENTION

The present invention relates to a system and method for removing pollution from water.

BACKGROUND OF THE INVENTION

It has long been desirable to remove pollutants from water in a safe, efficient and cost-effective manner.

Agricultural, industrial, and street run-off, among other polluted water flows, require treatment before being released into the environment. The high concentration or synthetic chemistry of these wastes can overwhelm self-purifying mechanisms in the receiving environment. When this occurs, the result is contaminated ground water and/or surface water.

In high-density population areas, it is typical to have a public waste water treatment system. In less densely populated areas, where public sewage treatment is not available, many homes and businesses use a septic system, implemented on-site, for the treatment and disposal of waste water or sewage. A typical on-site waste fluid treatment system or septic system includes a mound or drain field portion and a septic tank. Waste fluids may include such things as waste from washers and dryers, showers and bathtubs, toilets, disposals, disposal waste, sink waste water and commercial operations. In a typical on-site septic system, the waste water generally drains into a septic tank before being routed to the mound or drain field. A septic tank typically functions to separate the solid and liquid fractions of the waste water, and then typically introduces the effluent back into the ecosystem with significant and undesirable nutrients and other pollution.

The average life of a conventional on-site waste water treatment system is typically only seven to 10 years. A failing system can lead to public health concerns and non-point source pollution. Another concern of the conventional on-site water treatment facility beyond its finite life, is the inability to quickly assess the proper functioning of the system. Untreated waste water may be leaking into the ecosystem with little or no surface indication.

A primary concern with any on-site septic system or waste water treatment system is to ensure that nutrients and other pollutants are removed from the waste water before the waste water is introduced back into nature. If the water is not sufficiently pollutant-free, the effluent may contaminate surface or subsurface water creating water quality problems.

Natural wetlands have been used as waste water discharge sites for a long period of time, and the ability of wetland plants to remove pollutants from waste water is fairly well known. Constructed wetlands have made limited use of natural wetland potential.

Existing constructed wetlands, including surface water and subsurface flow systems, utilize wetland plants and atmospheric diffusion to transfer oxygen into the water column. These naturally aerated (aerobic) zones support populations of bacteria which require oxygen to support their metabolisms. Other areas within the constructed wetland are anaerobic, and support populations of bacteria which do not require oxygen. It is known that aerobic metabolic pathways are much more efficient than anaerobic pathways. Consequently, aerobic bacteria are capable of consuming, and thus removing, more of a pollutant than anaerobic bacteria for a given treatment cell size. In existing constructed wetlands, aerobic zones are typically only found at the top of the water column, in those regions where there is sufficient atmospheric diffusion, and in the immediate vicinity of wetland plant root hairs, where oxygen transported by wetland plants diffuses out through the root membrane. Therefore, in current constructed wetland systems, aerobic zones occupy only a small fraction of the constructed wetland. This lack of aerobic zones places a constraint on the overall treatment capacity of the wetland, particularly in subsurface flow constructed wetlands.

Accordingly, it would be desirable to more fully utilize the pollution and nutrient reducing characteristics of wetland plants in a constructed system to treat polluted water.

SUMMARY OF THE INVENTION

The invention provides a safe, efficient and cost-effective manner to reduce the pollutant level in polluted water or other fluids.

It is also an object of this invention to provide a constructed subsurface flow wetland system that can be used efficiently, effectively and safely to remove pollutants from polluted water.

It is a further object of this invention to provide for the calculated variable water level management of the water in the constructed wetland subsurface treatment system to promote a faster establishment of wetland vegetation, to promote thicker and deeper root growth of the wetland vegetation, and to thereby promote more effective pollutant removal processes.

It is a further object of this invention to provide for staged anaerobic and aerobic zones within the constructed wetland subsurface treatment cell to promote a systematic and more efficient treatment of polluted water.

BRIEF DESCRIPTION OF THE DRAWINGS

FIG. 4 depicts a further embodiment of the invention wherein the second cell is also a subsurface constructed wetland.

FIG. 5 illustrates a constructed subsurface wetland treatment cell with staged aerobic and anaerobic zones.

DETAILED DESCRIPTION OF THE INVENTION

This invention provides a basic subsurface flow constructed wetland system which materially increases the presence of aerobic zones within the treatment bed, and provides a means for increasing root growth for more effective pollution removal.

Wetland treatment systems are a form of phytoremediation, that is, they use living plant systems to solve a variety of water pollution problems. One embodiment of the invention, as can be seen in FIG. 1, consists primarily of a constructed wetland cell.

Figures 1, 2, 3, 9:
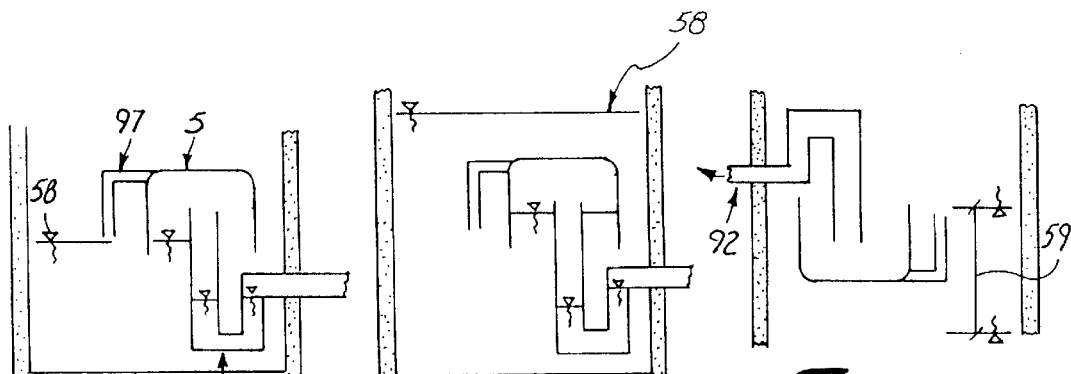
FIG. 1 is a cut-away view of a subsurface wetland treatment system, using primary and secondary treatment cells, the secondary treatment cell providing a chemical absorption function.
FIG. 2 illustrates a conventional on-site septic system.
FIG. 3 depicts another embodiment of a system generally depicted and partially similar to that shown in FIG. 1.
FIGS. 9.1, 9.2 and 9.3 illustrate a dosing syphon in operation.

FIG. 2 illustrates a conventional onsite septic system with septic tank 3 and drain field 7, with resulting discharge 12 of partially treated water. FIG. 3 is a similar system but with a wetland cell 15 and additional chemical absorption tank means 86, with treated water discharge 82. In the embodiment of FIG. 1, the system consists of two treatment zones—primary treatment cell 15 and secondary treatment cell 33. The primary treatment cell 15 is a lined wetland cell functioning as a treatment zone and consists of wetland plants 37 planted in bed media 50. Primary treatment cell 15 receives contaminated water through inlet pipe 40. Where the contaminated water is petroleum-based pollution, or other contamination which is primarily soluble, the flow 76 to inlet 40 into primary treatment cell 15 can occur without settling. However, where inlet pipe 40 is carrying household sewage, for example, solids are settled out before entering primary treatment cell 15, using other separation means. In this event, contaminated water might first be passed through a conventional septic tank 3 or other means prior to entering primary treatment cell 15. Depending on the nature of the pollution, other pretreatment devices may be necessary before flow 76 enters treatment cell 15.

Figure 12:
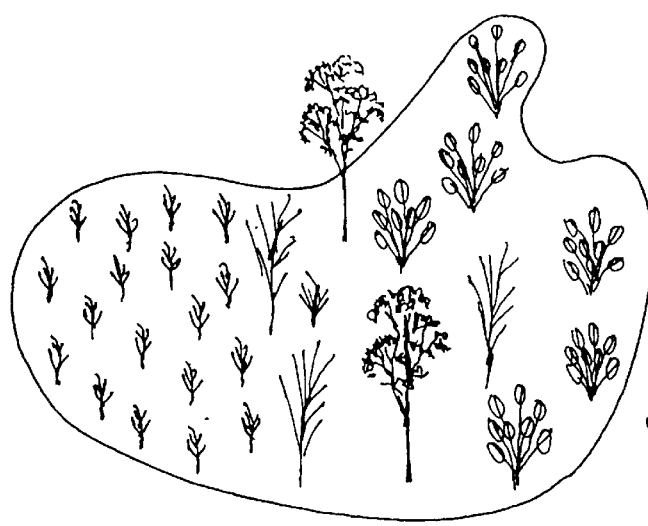
FIG. 12 illustrates a view of a constructed subsurface wetland treatment cell from above.

Primary treatment cell 15, in one preferred embodiment, is constructed by removing or excavating earth and creating a basin. FIG. 12 illustrates an aerial view of such a wetland treatment cell. The depth of primary treatment cell 15, while typically only 12 to 24 inches, is practical up to about 24 feet, when other factors, discussed later, make further depths impractical. The primary treatment cell 15 is lined with impermeable liner 10. Impermeable liner 10 lines generally the entire subsurface portion of primary treatment cell 15. In this embodiment of the invention shown in FIG. 1, inlet pipe 40 and exit pipe 43 are positioned through liner 10.

Referring generally to FIGS. 1, 2, 5, 11, 15, impermeable liner 10 is configured with inlet pipe 40 sealed by an inlet seal 24. Advantageously, the inlet seal 24 is constructed by producing a hole in impermeable liner 10 smaller than the diameter of inlet pipe 40. The liner 10 is stretched over inlet pipe 40 and then sealed by using adhesive mastic materials. This technique ensures that inlet pipe 40 will carry untreated water 76 into primary cell 15, generally ensuring that the water will not seep out of primary cell 15 and into the environment without first being treated. This same technique is used in installing exit pipe 43.

The bed media 50 contains bacteria capable of breaking down organic matter in waste water. A primary attribute of bed media 50 is to provide surface area for bacteria. These bacteria include those from the taxa Bacillus, Pseudomonas, Cellulomonas, Aerobacter, Rhodopseudomonas, Anabaena, Nitrosomonas, and Nitrobacter and can be further characterized as cyanobacteria, anaerobic bacteria, aerobic bacteria, and photosynthetic bacteria. These bacteria arc disclosed in U.S. Pat. Nos. 5,762,801, 5,087,353, and 4,872,985, which are incorporated by reference in U.S. patent application Ser. No. 60/050,533, from which the present application claims priority under 35 U.S.C. § 119(c). The type of bed media, and therefore the type of bscteria to be found on the media, can be specific to the type of pollutants to be removed from the water or other fluid passing through. One generally characteristic requirement is that the surface area of each particulate of bed media be maximized so as to maximize the area in which to house bacteria, within optimized limits. One preferred bed media 50 is gravel. Gravel is a preferred bed media because of its inexpensive cost and its generally adequate surface area. Though gravel is a preferred embodiment for treating certain types of polluted water, including waste water, the use of gravel as a bed media should not be deemed limiting in connection with this invention. It is anticipated, in fact, that certain types and shapes of synthetic media, such as spherical plastic beads, might be an advantageous bed media under certain circumstances. It is also generally known as to which types of bed media would be most advantageous to deal with specific water pollution problems. For example, using a bed media such as limestone is beneficial to neutralize Acid Mine Drainage (AMD.)

Other generally important functions of bed media 50 material are to provide surface area for bacteria to grow on, to provide trace minerals (if needed) to support the nutritional requirements of plants, bacteria, and fungi living in the wetland system, to allow the hydraulic conveyance of water through the bed without plugging or surfacing of the water flow, and to provide specific chemical properties, such as pH adjustment or phosphorus absorption.

Figure 7:
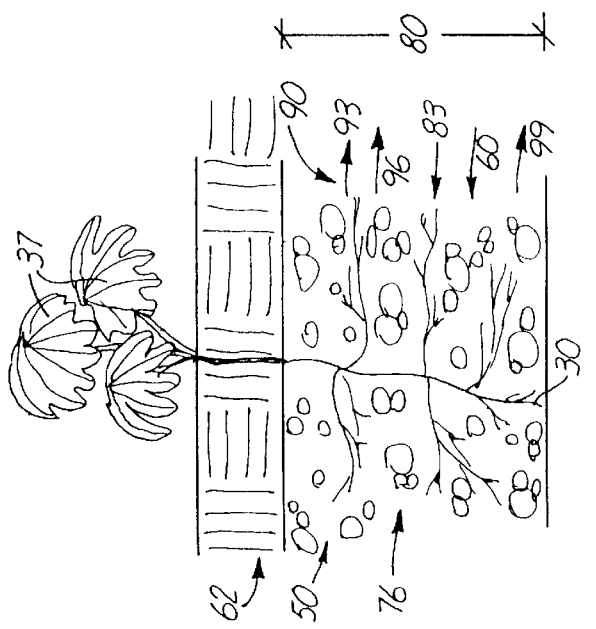
FIG. 7 is a detailed schematic depiction of interaction of the plants with regard to pollutant removal.
Figure 11:
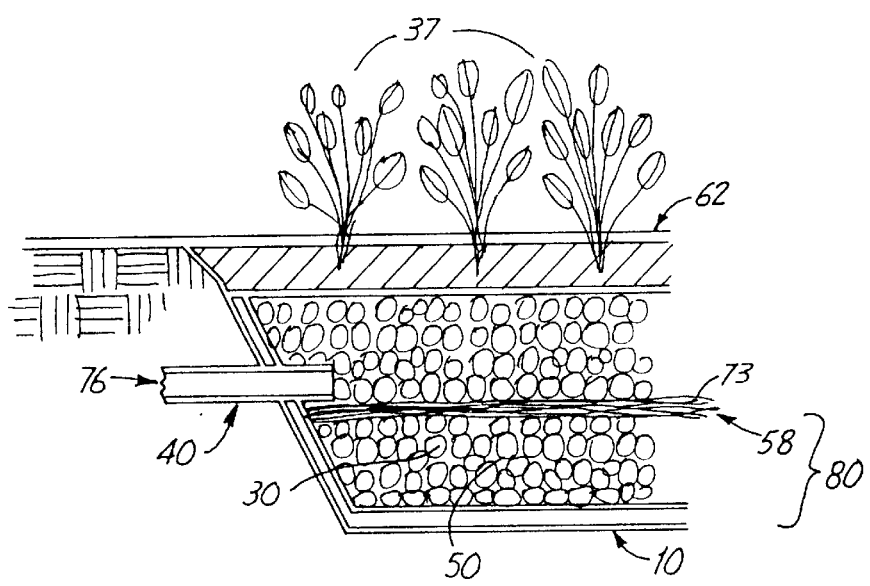
FIG. 11 illustrates a close-up view of a constructed subsurface wetland treatment cell.

FIG. 11 depicts a more detailed view of a portion of primary treatment cell 15. As can be noted, impermeable liner 10 runs circumferentially around the subterranean portion of primary treatment cell 15. Inlet pipe 40 enters the primary treatment cell, generally proximate the top of primary treatment cell 15. The level of water is regulated within the primary treatment cell to ensure that the water level 73 never rises above the inner diameter of inlet pipe 40, to prevent the backflow of untreated water. In this embodiment, vertical treatment zone 80 is generally defined by the area between the top of water level and the surface of impermeable liner 10. It should also be noted from FIG. 7 that the root structure of wetland vegetation 37 has propagated nearly the full depth of primary treatment cell 15. The depth and invasiveness of root structure 30 is an important factor in efficient and effective pollution removal. The wetland vegetation 37 enhances the treatment process in many ways, as shown in FIG. 7. As untreated water flow 76 passes through primary treatment zone 80, bacteria growing on the surface of bed media 50 removes pollutants in the water. Oxygen 99 diffuses out through root hairs into treatment zone 80. Nutrients 60 are uptaken by the vegetation 37 to produce plant biomass. Large quantities of water are removed by evapotranspiration 83 to support vegetation 37. In addition, plants excrete enzymes and other exudates 93 in an effort to metabolize toxic compounds or obtain trace nutrients. In this effort, micro-rhizae fungi 96 facilitates many of these chemical transactions in a symbiotic relationship with wetland vegetation 37. Suitable wetland vegetation genera include Iris spp., Lemna spp., Phragmites spp., Salix spp., Scirpus spp., and Typha spp. Suitable species include *Alnus glutinosa, Bolboschoenus maritimus, Ceratophyllum submersum, Carex gracilis, Carex acutiformis, Cyperus alternifolius, Glyceria maxima, Hydrocharis morsus-ranae, Iris pseudacorus, Juncus subnodulosus, Myriophyllum spictatum, Phragmites communis, Potamogeton perfoliatus, Potamogeton pectinatus, Scirpus lacustris, Stratiotes aloides, Tricularia vulgaris, Typha angustfolia, Typha lattifolia,* and *Typhoides arundiaseae*. These wetland plant taxa are disclosed in U.S. Pat. Nos. 5,389,257, 5,273,653, 5,087,353, 4,855,040, and 4,333,837, which are incorporated by reference in U.S. patent application Ser. No. 60/050,533, from which the present application claims priority under 35 U.S.C. § 119(e).

The efficiency of pollutant removal is directly related to the presence of aerobic zones 46 within the subsurface flow wetland treatment bed, as depicted in FIG. 5. Natural aerobic zones occur in existing subsurface flow wetlands by the transport of oxygen through either passive atmospheric diffusion or the transfer of oxygen by wetland plants to support their root tissues. Generally, then, it is advantageous—especially when nitrogen compounds represent the with pollutant-to set up alternating aerobic zones. Aerobic zones have a high oxidation-reduction potential, and anaerobic zones 48 have a low oxidation reduction potential. Alternating anaerobic and aerobic zones can be advantageous to pollutant removal. As is generally known in the art, treating sewage typically involves nitrification and denitrification processes. Ammonification involves a transformation of organic nitrogenous compounds to inorganic ammonium $NH_4+$. This transformation is a precursor to subsequent nitrogen removal mechanisms. In an aerobic zone with certain types of pollution, especially those containing ammonia, utilizing specific species of bacteria is quite efficacious, such as when $NH_4$ oxidizes into $NO_3$. Subsequent anaerobic zones, then, denitrify the $NO_3$. Upon denitrification, the nitrogen is transformed into nitrogen gas. This gas is lost to the atmosphere, effectively removing it from the water. Similarly, alternating anaerobic and aerobic zones have been shown to benefit the growth of bacteria which remove phosphorus from the water and store it in their body tissues.

Figure 13:
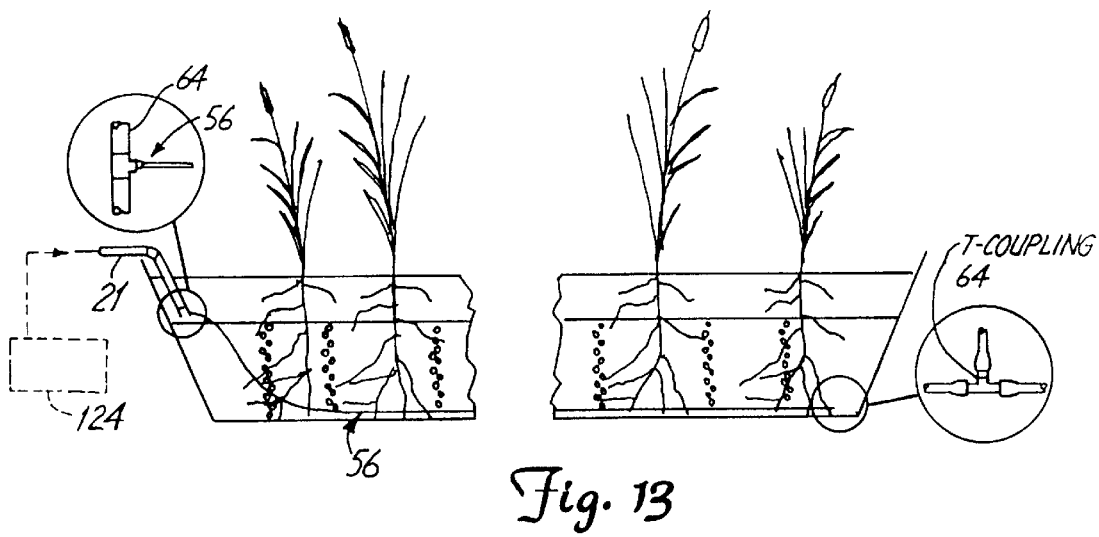
FIG. 13 illustrates a method of aerating a constructed subsurface wetland treatment cell.

FIG. 5 depicts one embodiment with deliberately engineered alternating aerobic and anaerobic zones. In this embodiment, air is bubbled from the bottom of the primary treatment cell 15, through the root structure 30, to the top of water level 58. Oxygen present in the air diffuses out of the water as the air bubbles move up through the water column. FIG. 13 further depicts this process. One embodiment shown in FIG. 13 uses a coupling of PVC-type material with a perforated flexible hose on the floor of the primary treatment cell 15. Oxygen is pumped through the pipe 56 to forcibly aerate the cell. It is advantageous to limit the amount of aeration—not only physically within zones throughout the primary treatment cell—but also to vary the oxidation gradient within the water to promote microbial diversity, oxygen transfer efficiency, and the type of chemical transformations described above. The aeration process has many benefits to the invention. The nitrification reaction generally involves the conversion of ammonium $NH_4+$ to nitrate $NO_3-$ by a two-step reaction using two categories of bacteria. One category generally operating in the aerobic and the other in the anaerobic zones. One of the primary benefits of the aeration is that it accelerates the nitrification step. In the case of waste water, such as domestic sewage, ammonia is nitrified by oxidizing the ammonia to nitrite ions and then to nitrate ions by using different microbacteria populations.

In a primary treatment cell using the forced bed aeration, as depicted in FIGS. 5 and 13, the depth of the primary treatment cell can reach five feet or more below ground surface 22, being limited only by the depth at which aeration is no longer cost-effective, which is generally at depths of 20–25 feet.

Figure 8:
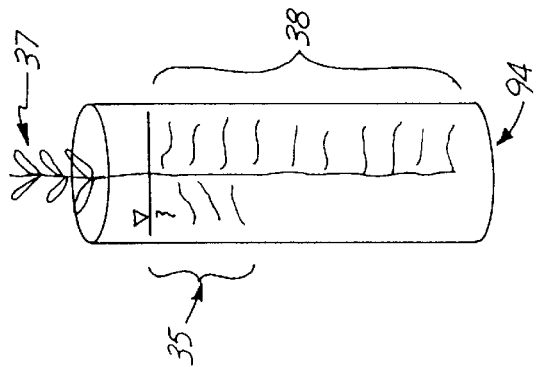
FIG. 8 is a further illustration of the effect of aeration on root depth.
Figure 6:
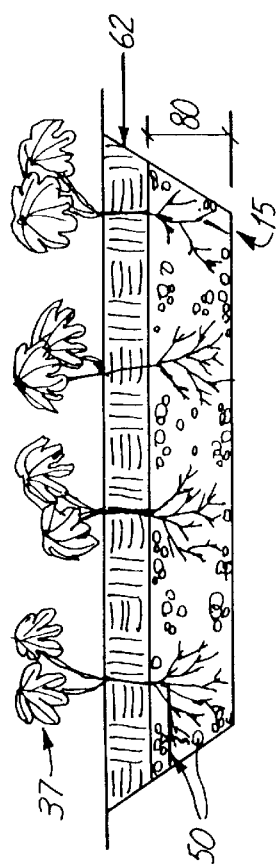
FIG. 6 depicts a constructed subsurface wetland treatment cell with deep root penetration.

Aeration of the bed also promotes greater rooting depth in the wetland plants. FIG. 8 depicts a general illustration of root depth 35 without aeration, and root depth 38 with aeration. Because with forced bed aeration, oxygen is available in the treatment bed in the vicinity of the plant roots, the plant has less of a chemical gradient to overcome when transporting oxygen from the leaves, through the stems, and to the roots. With a smaller chemical gradient, less metabolic energy is needed to support root tissues. Consequently, the plant can support more roots, at a greater depth, than could be supported in a standard wetland system.

Typically, continuous aeration in the forced aeration system, would not be necessary. Once the oxygen content in the water within primary treatment cell 15 reaches a generally saturated point, further aeration is inefficient. Therefore, aeration using oxygen sensors, timers, or other means to regulate aeration is contemplated in the forced aeration embodiment of the subject invention.

A further embodiment of the subject invention is depicted, referring again to FIG. 4. As can be noted, dosing syphon 5 is located between primary treatment cell 15 and secondary treatment cell 33. This advantageous configuration can control both upstream water level 58 and the downstream water level in secondary treatment cell 33. The controlling of the upstream, or primary treatment cell water level, has many important implications in the operation of the invention. The calculated lowering of the water levels in primary treatment cell 15 will increase the natural root growing process of wetland vegetation 37, increasing the propagation of the root structure of wetland vegetation 37 within primary treatment cell 15. As water level 58 is lowered, and sustained at the lower levels for a sufficient period of time, root structure 30 of the wetland vegetation will grow deeper in its natural search for the needed environment of water and accompanying nutrients. Further, bed media 50 exposed to the oxygen atmosphere created by the lower water levels will permit the bacteria to store oxygen, making the bacteria more efficient once the water levels are again raised to cover the bed media. Through controlled variation of the levels, the propagation of the root structure and oxidation of the bacteria can be optimized, increasing the effectiveness and efficiency of the system in removing pollutants from water.

The internal workings of the dosing syphon can be seen in FIGS. 9.1, 9.2, and 9.3. The dosing syphon is a passive system that regulates the levels of the primary treatment cell over time, based on the rate of inflow from inlet pipe 40 passing through outlet pipe 43 and the dimension of the dosing syphon. The dosing syphon requires no electricity and has no moving parts, for economy, reliability and long life.

The primary treatment cell consists of at least one staged aerobic zone and at least one staged anaerobic zone. The at least one staged aerobic zone is assisted by means for air injection 124 (FIG. 13).

It is contemplated by this invention that multiple primary treatment cells, each separated by dosing chamber 87, containing a dosing syphon 5, or other water level control means, could be chained in parallel or series, depending on specifics such as pollutant mass flow, and other factors. Secondary treatment cells can also be so configured in combination with primary treatment cells.

It is also contemplated that this invention can be constructed without dosing syphon 5, replacing dosing syphon 5 with a standpipe (not shown) which would then fix the water level in primary treatment cell 15. The primary treatment cell, in this configuration, would consist of aerated and non-aerated zones.

Mulch layer 62 is located on top of bed media 50. Mulch layer 62 can consist of a variety of different natural substances, for example, decomposed yard waste, or peat. One primary function of mulch layer 62 is to provide insulation for the system during winter months, in climates with temperatures generally below freezing during the winter months, and odor control. Generally two concerns arise when determining the depth of mulch layer 62. For efficient operation of standard subsurface flow constructed wetland systems, oxygen transfer via atmospheric diffusion must take place between the underlying bed media and the atmosphere. Therefore, it is important that mulch layer 62 not be so thick as to inhibit this beneficial oxygen transfer. Again, mulch layer 62 must be thick enough to provide insulation for the underlying system to ensure that microbial populations can maintain life functions and the root structure of the wetland vegetation is not damaged, due to cold temperatures, and still allow for oxygen transfer via atmospheric diffusion. The insulating properties of a 12-inch thick mulch layer in 5 different wetland treatment systems is shown in FIG. 14.

Figure 14:
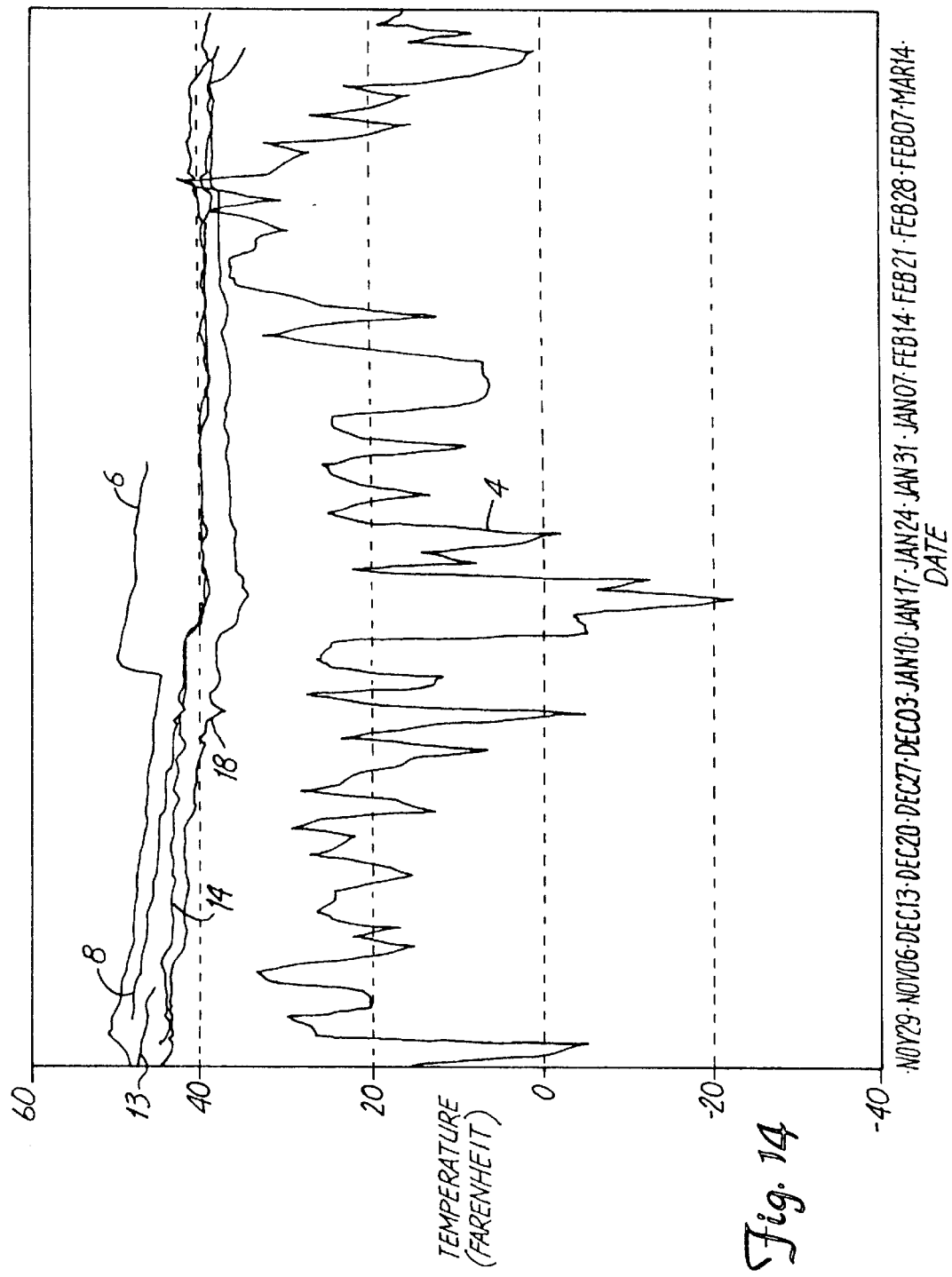
FIG. 14 is a graphic representation of air temperature vs. system temperature, illustrating the insulating effect of the mulch.

In FIG. 14, lower contiguous line 4 represents air temperature readings taken between November 1997 and March 1990. The readings were generally taken in the morning hours. Upper graph lines 6, 8, 13, 14, 18 represent the corresponding temperatures of the effluent in five different wetland treatment cells. The subject treatment cells were all located in Minnesota, U.S. The mulch layer depth of each bed was constructed at generally 14 inches. Through settling, the range of depth was generally 12 inches to 14 inches. As the graph demonstrates, the liquid in the treatment cells never fell below freezing, even when outside air temperature dropped below 0° F. Advantageously, the invention design with a mulch layer of generally 14 inches, provides generally good insulation, allowing the liquid in the treatment cell to remain above freezing, and thus allowing the bacteria to remain active to perform its pollutant removing function.

Further, mulch layer 62 must have sufficient depth for odor control. Bacteria living in the mulch layer degrade odorous compounds present in waste water, such as methane and hydrogen sulfide. Therefore, it is important that organic material be used to support bacteria growth. Though mulch layer 62 may in fact approach 24 inches or more in depth, one preferred embodiment of the subject system would be a mulch layer 62 of 6 to 14 inches. The bed media may be deeper than the mulch layer.

The decomposed nature of mulch layer 62 is very important. It has been discovered through experimentation in the preparation of this invention, that using natural material that has not substantially decomposed, such as green wood chips or other similar undecomposed material, adds pollutants to the water being treated. Because decomposition is still taking place, bi-products from these materials can leach downwards into the primary treatment cell, adding pollutants to the water in the primary treatment cell. It is further contemplated that mulch layer 62 can be a combination of synthetic material, for example foam bits, and natural decomposed material.

After the effluent is treated in primary cell 15, the invention contemplates a number of embodiments to further prepare the waste water for introduction back into the ecosystem.

One embodiment, depicted in FIG. 1, shows exit pipe 43 connecting primary treatment cell 15 to a secondary treatment cell 33. Again, depending on the nature of the pollutants to be removed from the waste water, secondary treatment cell 33 can contain a variety of natural or synthetic bed media, a variety of bacteria, and a variety of wetland vegetation planted therein. It is anticipated by this invention that the construction of the secondary treatment cell can be similar to the primary treatment cell, including similar bed media and mulch layer, except that, typically, the secondary treatment cell is constructed without impermeable liner 10. Secondary treatment cell 33 may include an enclosure constructed of concrete and may further include a surface accessible cover panel 88. This is because secondary treatment cell 33 typically has the additional purpose of redistributing the treated water into discharge area 25, that is, back into the ecosystem. The release of the treated waste water back into the ecosystem can be done through infiltration out the bottom of secondary treatment cell 33 or through a variety of other means such as an additional exit pipe 84 from the secondary treatment cell 33.

When the use is for residential housing, where waste water treatment demands are more or less predictable, it is contemplated that this invention could be prefabricated, that is, completely assembled off-site. Primary treatment cell 15 can be preconstructed out of a suitable lightweight material for ease of transport, and can be filled with a light, synthetic media. The mulch layer and wetland vegetation may also be preplanted, with the growth process already underway by the time the unit is delivered to the site.

Figure 15:
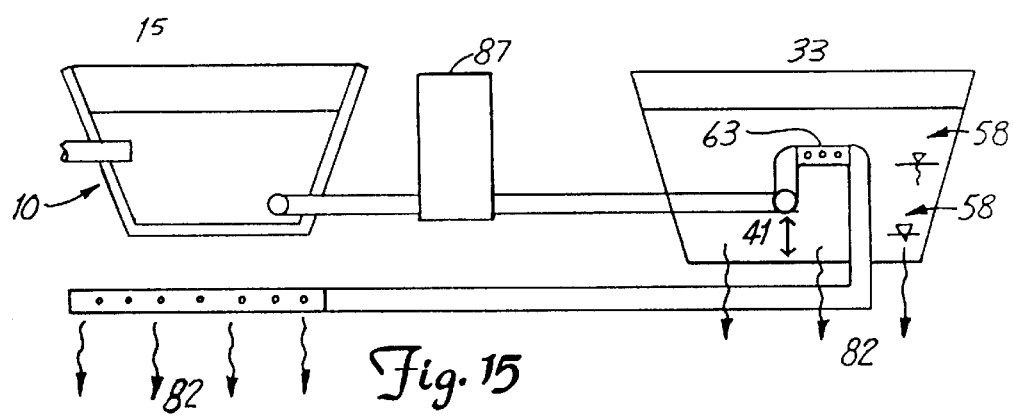
FIG. 15 is an additional embodiment of the invention, illustrating an extension of the infiltration area beneath the wetland treatment cell.

Another embodiment of the invention extends the infiltration area of secondary treatment cell 33 beneath primary treatment cell 15. This is depicted in FIG. 15. In this case, pipes placed in secondary treatment cell 33 collect excess water and convey it to perforated pipes placed below impermeable liner 10. Optionally, the piping in secondary treatment cell 33 can be configured in a number of ways such that water must pond and rise, flowing from open pipe 41, to a certain water level before entering perforated pipes 63 placed below impermeable liner 10. In this way, the area beneath primary treatment cell 15 can be used as a back-up infiltration area in the event that the hydraulic loading into secondary treatment cell 33 exceeds the infiltration capacity of secondary treatment cell 33. Further, this embodiment is advantageous when limited physical space exists at the site.

Under certain circumstances and under certain water pollutant situations, secondary treatment cell 33 may not be needed. It is anticipated, under some circumstances, that treated waste water can exit from primary treatment cell 15 and can be redistributed into the ecosystem through drip irrigation or other techniques known by those skilled in the art.

Figure 10:
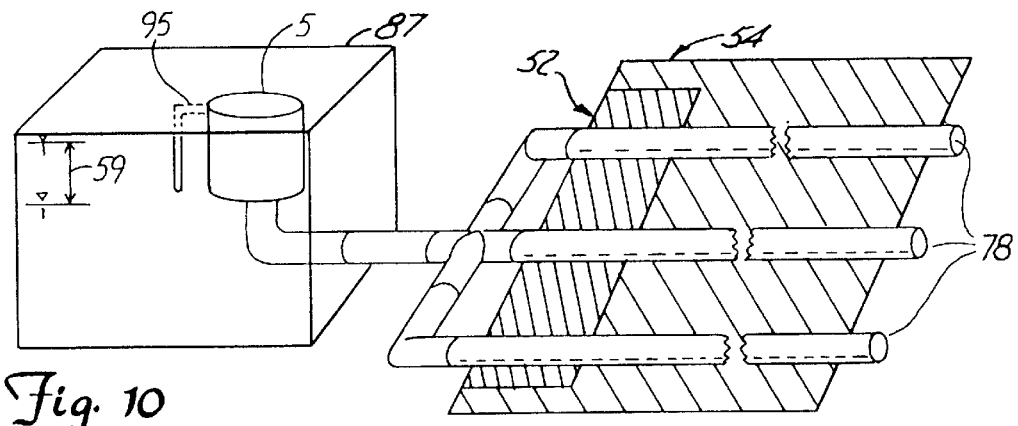
FIG. 10 illustrates the isolation of the dosing syphon chamber connected to a means for reintroducing treated water back into the ecosystem.

FIG. 10 illustrates a further embodiment of the subject invention wherein water distribution pipe 78 distributes treated water from dosing chamber 87 over wide area 54. Limited distribution 52 depicts the likely distribution area without benefit of the water level control system. As FIG. 10 illustrates, the water level within dosing chamber 87 varies within the range 59 to provide sufficient hydraulic force available to permit distribution of the treated water over wide area 54.

Another aspect of the embodiment of the subject invention that is depicted in FIG. 1 is that the secondary treatment cell is not a constructed wetland, as the primary treatment cell, but instead contains natural or synthetic media designed to remove phosphorus or boron or other such similar compounds through chemical absorption. Any combination of primary and secondary cells, including chemical absorption cells, can be advantageously configured to adapt to the type of pollutants to be treated.

As shown above, FIG. 3 is a view of one improved embodiment, that was also represented in FIG. 1. This embodiment is for a residential on-site septic system. The solids from the domestic waste are settled out in septic tank 3 and then introduced into primary treatment cell 15. At the appropriate time, governed by dosing syphon 5, or other water level control means, the effluent is introduced into secondary treatment cell 33. As the flow continues, the effluent level rises up through the perforations in water distribution pipe 78 and is introduced to chemical absorbent treatment layer 86 until water level 58 has risen sufficiently to exit via secondary treatment cell exit pipe 27.

A further advantage of the subject invention is that, as the wetland vegetation becomes more substantial, the efficiency of the system improves. Unlike a conventional system, as illustrated in FIG. 2, where the system may require substantial maintenance and periodic replacement, this constructed wetland treatment facility is low maintenance, long-lasting, clean and efficient, requiring little, if any, outside energy to operate, with continued operation even during severely cold winters.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What is claimed is:

1. A system for removing pollutants from water, the system comprising:
   an impermeable primary treatment cell substantially disposable within the earth and including a horizontal linear dimension, the horizontal linear dimension with a first end and a second end, the primary cell including:
      an inlet for providing a flow of polluted water disposed proximate the primary treatment cell first end,
      bed media including bed media particulates that exclude any adhesive connections therebetween,
      wetland vegetation rooted in the bed media,
      aerobic and anaerobic bacteria disposed proximate the bed media particulates,
      means for air injection disposed proximate a bottom portion of the primary treatment cell and configured to establish a plurality of aerobic zones in the flow of polluted water and exterior to said bed media particulates by injecting air at a plurality of locations horizontally spaced along the primary treatment cell linear horizontal dimension and at least one anaerobic zone in the flow of polluted water disposed horizontally between the aerobic zones and exterior to said bed media particulates, and
      an exit disposed proximate the primary treatment cell second end, the polluted water flowing substantially horizontally from the inlet, through spaces between the bed media particulates, and out the exit, the pollutants being removed as the water flows through the plurality of aerobic zones and at least one anaerobic zone when flowing through spaces between the bed media particulates.

2. The system of claim 1, in which the bed media comprises gravel.

3. The system of claim 1, in which the bed media comprises limestone.

4. The system of claim 1, in which the air injection means establishes the plurality of aerobic zones by aeration which is not continuous.

5. The system of claim 1, tie primary treatment cell further comprising an impermeable liner lining a subsurface portion of the primary treatment cell, the impermeable liner defining holes sealingly accommodating the inlet and exit.

6. The system of claim 1, further comprising a mulch layer overlaying the bed media.

7. The system of claim 6, the mulch layer comprising peat.

8. The system of claim 6, in which the mulch layer includes a depth of between about 6 inches and 24 inches.

9. The system of claim 6, in which the mulch layer includes a depth of between about 6 inches and 14 inches.

10. The system of claim 6, in which the mulch layer includes a depth of between 12 inches 14 inches.

11. The system of claim 6, in which a bed media depth is greater than a mulch layer depth.

12. The system of claim 6, in which the mulch layer is substantially decomposed.

13. The system of claim 6, in which the wetland vegetation is selected from the group consisting of Iris spp., Lemna spp., Phragmites spp., Salix spp., Scirpus spp., Typha spp., *Alnin glutinosa, Bolboschoenus maritimus, Ceratophyllum submersum, Carex gracilis, Carex acutiformis, Cyperns alternifolius, Glyceria maxima, Hydrocharis morsus-ranae, Juncus subnodulosus, Myriophyllum spictatum, Potamogeton perfoliatus, Potamogeton pectinatus, Stratiotes aloides, Tricularia vulgaris, Typhoides arundiaseae* and any combination thereof.

14. The system of claim 1, in which the wetland vegetation is selected from the group consisting of Iris spp., Lemna spp., Phragmites spp., Salix spp., Scirpus spp., Typha spp., *Alnus glutinosa, Bolboschoenus maritimus, Ceratophyllum submersum, Carex gracilis, Carex acutiformis, Cyperus alternifolius, Glyceria maxima, Hydrocharis morsus-ranae, Juncus subnodulosus, Myriophyllum spictatum, Potamogeton perfoliatus, Potamogeton pectinatus, Stratiotes aloides, Tricularia vulgaris, Typhoides arundiaseae*, and any combination thereof.

15. The system of claim 1, in which the aerobic and anaerobic bacteria are selected from the group consisting of Bacillus, Pseudomonas, Cellulomonas, Aerobacter, Rhodopseudomonas, Anabaena, Nitrosomonas, Nitrobacter, and any combination thereof.

16. The system of claim 1, further comprising a water level control device in fluid communication with the primary treatment cell exit and configured to lower the water level in the primary treatment cell to promote deeper root growth of the wetland vegetation.

17. The system of claim 16, the water level control device comprising a dosing siphon.

18. The system of claim 16, rater comprising at least one secondary treatment cell receiving treated water from the primary treatment cell via the water level control device and discharging further treated water into the ecosystem, a portion of the secondary treatment cell being permeable to allow egress of further treated water into the ecosystem.

19. The system of claim 18, the secondary treatment cell comprising bed media.

20. The system of claim 19, the secondary treatment cell comprising wetland vegetation rooted in the bed media.

21. The system of claim 19, the secondary treatment cell fiber comprising a mulch layer overlaying the bed media.

22. The system of claim 21, the secondary treatment cell further comprising wetland vegetation rooted in the bed media and growing through the mulch layer.

23. The system of claim 21, in which the mulch layer is substantially decomposed.

\* \* \* \* \*

UNITED STATES PATENT AND TRADEMARK OFFICE
CERTIFICATE OF CORRECTION

PATENT NO.    : 6,200,469 B1
DATED         : March 13, 2001
INVENTOR(S)   : Scott D. Wallace It is certified that error appears in the above-identified patent and that said Letters Patent is hereby corrected as shown below:

Column 4,
Lines 4-6, please delete the words "Bacillus, Pseudomonas, Cellulomanas, Aerobacter, Rhodopseudomonas, Anabaena, Nitrosomonas, and Nitrobacter" and insert in their place -- *Bacillus, Pseudomonas, Cellulomonas, Aerobacter, Rhodopseudomonas, Anabaena, Nitrosomonas, and Nitrobacter* --.
Line 13, please delete the word "bscteria" and insert in its place -- bacteria --.

Column 5,
Line 26, please delete with the word "with".
Line 26, please after the word "pollutant" please delete the "-".
Line 37, please delete the "." after the word "utilizing".

Column 10,
Line 4, please delete with the word "tie" and insert in its place -- the --.
Line 16, after the words "12 inches" please insert -- and --.
Lines 22-23 and 32-33, please delete the words "Iris spp., Lemna spp., Phragmites spp., Salix spp., Scirpus spp., Typha spp.," and insert in their place -- *Iris* spp., *Lemna* spp., *Phragmites* spp., *Salix* spp., *Scirpus* spp., *Typha* spp., --.
Line 24, please delete the word "*Alnin*" and insert in its place -- *Alnus* --.
Line 25, please delete the word "*Cyperns*" and insert in its place -- *Cyperus* --.
Lines 43-44, please delete the words "Bacillus, Pseudomonas, Cellulomanas, Aerobacter, Rhodopseudomonas, Anabaena, Nitrosomonas, and Nitrobacter" and insert in their place -- *Bacillus, Pseudomonas, Cellulomonas, Aerobacter, Rhodopseudomonas, Anabaena, Nitrosomonas, and Nitrobacter* --.
Line 53, please delete the word "rater" and insert in its place -- further --.
Line 64, please delete the word "fiber" and insert in its place -- further --.

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,200,469 B1                                              Page 1 of 1
DATED        : March 13, 2001
INVENTOR(S)  : Scott D. Wallace It is certified that error appears in the above-identified patent and that said Letters Patent is hereby corrected as shown below:

Column 4,
Lines 4-6, please delete the words "Bacillus, Pseudomonas, Cellulomanas, Aerobacter, Rhodopseudomonas, Anabaena, Nitrosomonas, and Nitrobacter" and insert in their place -- *Bacillus, Pseudomonas, Cellulomonas, Aerobacter, Rhodopseudomonas, Anabaena, Nitrosomonas, and Nitrobacter* --.
Line 13, please delete the word "bscteria" and insert in its place -- bacteria --.

Column 5,
Line 26, please delete with the word "with".
Line 26, please after the word "pollutant" please delete the "-".

Column 10,
Line 4, please delete the word "tie" and insert in its place -- the --.
Line 16, after the words "12 inches" please insert -- and --.
Lines 22-23 and 32-33, please delete the words "Iris spp., Lemna spp., Phragmites spp., Salix spp., Scirpus spp., Typha spp.," and insert in their place -- *Iris* spp., *Lemna* spp., *Phragmites* spp., *Salix* spp., *Scirpus* spp., *Typha* spp., --.
Line 24, please delete the word "*Alnin*" and insert in its place -- *Alnus* --.
Line 25, please delete the word "*Cyperns*" and insert in its place -- *Cyperus* --.
Lines 43-44, please delete the words "Bacillus, Pseudomonas, Cellulomanas, Aerobacter, Rhodopseudomonas, Anabaena, Nitrosomonas, and Nitrobacter" and insert in their place -- *Bacillus, Pseudomonas, Cellulomonas, Aerobacter, Rhodopseudomonas, Anabaena, Nitrosomonas, and Nitrobacter* --.
Line 53, please delete the word "rater" and insert in its place -- further --.
Line 64, please delete the word "fiber" and insert in its place -- further --.

Signed and Sealed this

First Day of April, 2003

JAMES E. ROGAN
*Director of the United States Patent and Trademark Office*